Dec. 15, 1964    E. B. WRIGHT    3,161,792
MAGNETOSTRICTIVE TRANSDUCER APPARATUS
Original Filed March 20, 1958    3 Sheets-Sheet 1
Fig. 1.
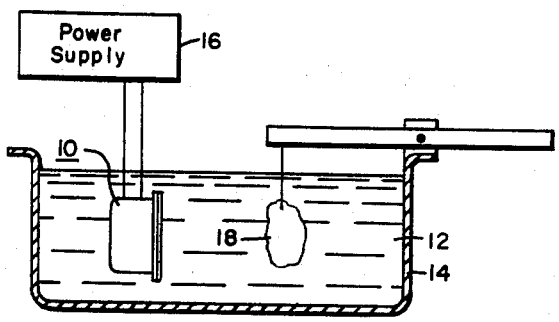
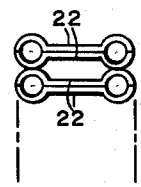
Fig. 9.
Fig. 2.
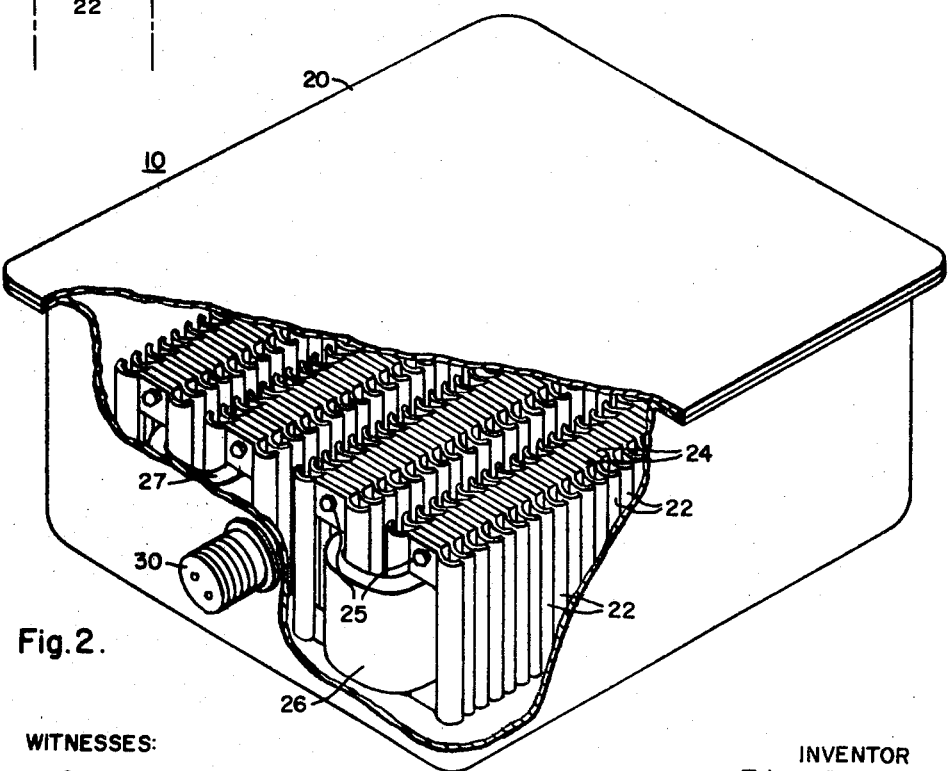
WITNESSES:
Bernard R. Gieguay
Robert C. Baird
INVENTOR
Edwin B. Wright
BY R.J. Brodahl
ATTORNEY Dec. 15, 1964  E. B. WRIGHT  3,161,792
MAGNETOSTRICTIVE TRANSDUCER APPARATUS
Original Filed March 20, 1958  3 Sheets-Sheet 2

United States Patent Office 3,161,792
Patented Dec. 15, 1964

3,161,792
MAGNETOSTRICTIVE TRANSDUCER
APPARATUS
Edwin B. Wright, Baltimore, Md., assignor to Westinghouse Electric Corporation, Pittsburgh, Pa., a corporation of Pennsylvania
Continuation of abandoned application Ser. No. 722,817, Mar. 20, 1958. This application Sept. 11, 1962, Ser. No. 223,305
6 Claims. (Cl. 310—26)

The present invention relates, in general, to electrical transducer apparatus, and more particularly to electrical transducer apparatus utilizing lamination members made of magnetostrictive material for converting electrical energy into a different form of energy such as vibrational energy within a predetermined medium such as a liquid. This application is a continuation of patent application Serial No. 722,817 filed March 20, 1958, now abandoned.

It is an object of the present invention to provide improved transducer apparatus for converting electrical energy into a different energy form such as vibrational energy within a liquid medium or the like.

It is another object of the present invention to provide improved transducer apparatus having an energy radiating transducer member that may be positioned within a predetermined medium such as a liquid and moved as a unitary structure in a manner similar to a piston for radiating energy within said predetermined medium.

It is a different object to provide improved transducer apparatus having a better operating efficiency and greater versatility relative to adjusting and controlling the impedance match involved in converting electrical energy into a different form of energy such as sonic energy or vibratory acoustic energy within a predetermined medium such as a liquid medium.

It is an additional object to provide improved transducer apparatus providing a better selection of the output power into a predetermined medium such as a liquid and the operating efficiency of the transducer apparatus, and in addition having better cooling qualities during the operation thereof.

It is a further object to provide improved transducer apparatus that is less costly to manufacture and more reliable in operation.

These and other objects and advantages of the present invention will become still more apparent from a study of the following description taken in conjunction with the accompanying drawings, wherein:

FIGURE 1 is a diagrammatic showing of electrical transducer apparatus such as in accordance with the present invention positioned within a liquid medium for acoustically cleaning a workpiece positioned within the liquid medium;

FIG. 2 is a perspective showing of the transducer apparatus in accordance with the present invention;

FIG. 9 shows a typical arrangement for obtaining self-spacing of magnetostrictive laminations in a transducer constructed in accord with the present invention.

Figure 3:
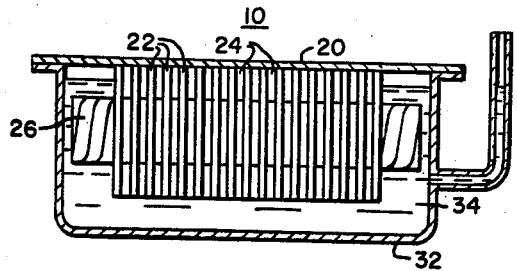
FIG. 3 is a side sectional view of the transducer apparatus in accordance with the present invention.

In FIG. 1 there is shown an electrical transducer apparatus or device 10 positioned within a liquid medium 12 contained within a tank 14. A suitable power supply 16 is connected to the transducer device 10 for energizing the transducer device to impart or provide sonic or ultrasonic energy in the form of acoustical or vibratory energy within the liquid medium 12. A workpiece 18 may be positioned within the liquid medium for the purpose of, for example, cleaning the workpiece or any other operation that may be desired by the sonic or ultrasonic vibration induced within the liquid medium 12 by the transducer device 10.

In FIG. 2 there is shown a perspective view of the transducer device 10 including a rectangular sheet-like radiating member, radiating plate, transducer member, transducer radiating member, or radiating transducer member 20 to which is fastened a plurality of spaced substantially planar magnetostrictive laminations or lamination members 22. It will be noted that one end of each lamination 22 has a width of about one-half the lamination length, which end is fastened to the transducer member 20, and that each lamination has convolutions extending along its length in a direction that is substantially perpendicular to the plane of the transducer member 20. Suitable spacing members 24 are provided between the lamination members 22 which can contribute to the desired rigidity and support strength of the lamination members 22. However, as shown in FIG. 9, the laminations may be shaped to be effectively self-spacing if desired without the spacing members. A transducer winding, coil, winding member or coil member 26 is operative with a first plurality or groups of the lamination members 22 which are in double-end straight-line open arrays, and second such transducer winding, coil, winding member, or coil member 27 illustrated in FIG. 2 is operative with a second plurality or group of lamination members parallel to the first groups. The transducer winding or coil members are energized with electrical energy through a suitable electrical connector 30 adapted to be connected to a suitable electrical power supply as shown in FIG. 1.

In FIG. 3 there is shown a side-sectional view of one form of the transducer device in accordance with the present invention wherein the transducer device 10 includes, in addition, to the radiating transducer member 20, a liquid containing tank member 32, with the spaced lamination members 22 and the one or more transducer winding or coil members 26 being suspended within the tank 32 containing a suitable liquid medium 34 such as water or the like. The transducer device, as shown in FIG. 3, is best suited for positioning with the transducer member 20 substantially horizontal and within a liquid medium as shown in FIG. 1.

Figure 4:
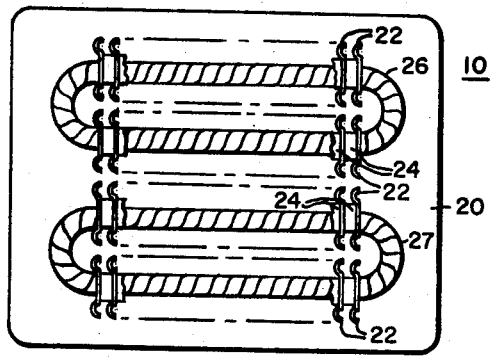
FIG. 4 is a bottom plan view of the transducer apparatus in accordance with the present invention.

In FIG. 4 there is shown a top or plan view of the transducer device 10 as shown in FIG. 2, with the coil winding 26 and the coil winding 27 clearly shown to be operative with separate groups of the respective lamination members 22.

Figure 5:
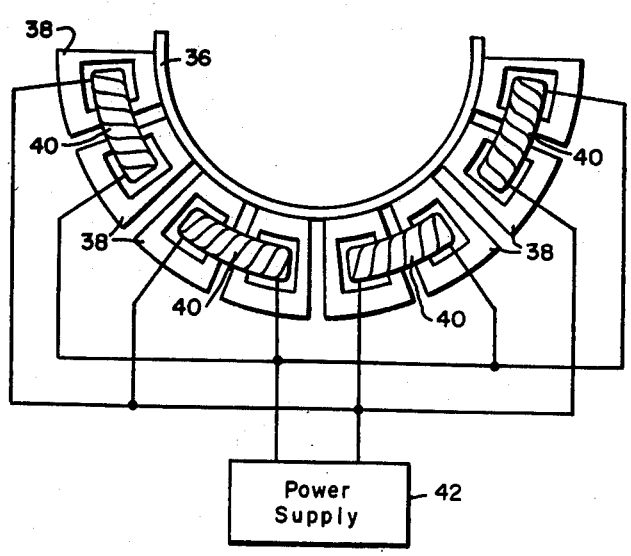
FIG. 5 is a schematic showing of a modification of the present transducer apparatus to permit focusing thereof.

In FIG. 5 there is shown a still further modification of the transducer device in accordance with the present invention, wherein an end view is shown of the radiating transducer member 36 having connected to it a plurality of spaced laminations or lamination members 38, with the transducer member 36 being shaped in curved form to effectively concentrate the kinetic energy resulting from its vibratory motion due to the operation of the lamination members 38 and resulting from energization of the coil windings 40 by a suitable power supply 42.

Figure 6:
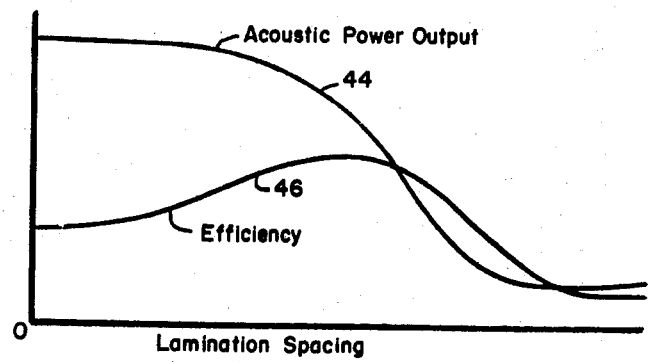
FIG. 6 is a curve illustrating the power output and efficiency of the transducer apparatus in accordance with the present invention as a function of the spacing of the lamination members.

In FIG. 6 there is shown an approximate curve plot of the acoustic power output as shown by curve 44 relative to the lamination spacing when using the transducer device as shown in FIG. 2 for example. A second curve 46 shows the efficiency of the energy transfer between the input electrical energy and the output kinetic energy plotted relative to the spacing of the laminations of the transducer device as shown, for example, in FIG. 2.

Figure 7:
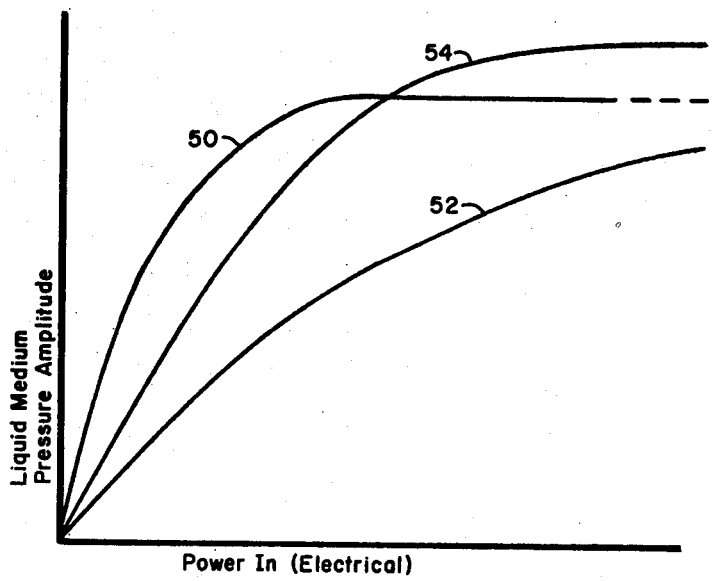
FIG. 7 is a curve illustrating the output pressure amplitude plotted as a function of input power for the transducer apparatus in accordance with the present invention as compared to prior art types of related electrical transducer apparatus.

In FIG. 7 there is a curve plot of output pressure amplitude, that is the acoustic vibrational pressure imparted to the liquid medium surrounding the transducer device, as a function of input electrical power. These curves were obtained by a pressure sensing probe member positioned approximately one inch above the center of the transducer radiating member 20. The curve 50 is a plot resulting from the use of a prior art barium titanate type of transducer device. The plot 52 is a curve for a prior art type of magnetostrictive device. The curve 54 is a plot for the spaced lamination transducer device in accordance with the present invention. The curves shown in FIG. 7 were obtained at an electrical frequency of approximately 20 kilocycles per second.

The space lamination transducer device, in accordance with the present invention, is made up of a number of magnetostrictive laminations 22 which are placed or fastened with or without alternate spacers 24 as may be desired on two rod members 25, as shown in FIG. 2, and which can be used to hold the assembly of laminations together. As shown in FIG. 2, the individual lamination members 22 are channeled or corrugated in shape or otherwise shaped to obtain better flexural rigidity for the dimension of the members substantially perpendicular to the radiating member 20. However, if the thickness of the individual lamination members is great enough, such shaping may not be necessary. This can be determined in the actual practice and usage of the transducer device.

Since there are no inherent theoretical restrictions of the length or width of the linear arrays of the lamination members which can be constructed in accordance with the present invention, the maximum size of the radiating area of the radiating transducer member 20 which can be obtained is limited only by the fabrication considerations relative to the support and positioning of the lamination members 22. In this regard, and as shown in FIG. 2, it is practical to drive a single transducer plate 20 with a number of individual spaced lamination member assemblies, with two such assemblies being shown in FIG. 2. Thusly, the transducer device, in accordance with the present invention, is very adaptable to high power transducers for the ultrasonic or sonic radiation of large liquid baths.

As shown in the following, the maximum spacing between the lamination members 22 is limited such that at the operating frequency there is very little bending of the radiating surface of transducer member 20. Also, since it is desirable to provide very little mass loading of the transducer lamination members 22, it is suggested that the thickness of the radiating plate 20 be held to in the order of ⅛ of an inch or less for 20 kc. operation. The material used to join or fasten the lamination members 22 to the plate member 20, whether it be silver solder or an epoxy resin, will tend to add some thickness and stiffness to the plate member 20; and thusly, it may be desirable to consider the thickness of the solder or resin material as part of the thickness of the plate member 20 relative to the design and spacing of the lamination members 22 when making a complete transducer device as shown in FIG. 2.

For irradiation of most liquid baths, the ideal lamination spacing appears to be in the order of .030 inch to .090 inch, which, for .005 inch thick laminations, can be translated in terms of being greater than the lamination thickness by a factor of six to eighteen. In the case of water, as the liquid medium, the characteristic impedance, $\rho c$, is in the order of $1.5 \times 10^5$ g./cm.² sec.; for nickel as used in the transducer device 10, it is in the order of $4.3 \times 10^6$ g./cm.² sec. If it is desired to match the mechanical impedance, $(\rho cA)_n$ for spaced nickel laminations to $(\rho cA)_w$ for water, the area ratio should be $$\frac{An}{Aw} = \frac{(\rho c)w}{(\rho c)n} = \frac{1.5 \times 10^5}{4.3 \times 10^6} = 0.035$$

Assuming that the window in each lamination, which window or opening is provided for the coil winding 26, reduces its cross-sectional area by one-third, the maximum spacing for nickel lamination members having a thickness value in the order of .005 inch should then be $$d = \left(\frac{.67}{.035} - 1\right) t = \left(\frac{.67}{.035} - 1\right)(.005) = .090 \text{ inch}$$

while, as stated above, the preferred minimum spacing is in the order of 0.03 inch. The latter calculation assumes that the plate member 20 which the lamination members 22 are driving is of zero mass and infinite stiffness. To more nearly approach the latter condition in practice, the plate member 20 must be reasonably thin and not be required to bridge too large a spacing between the lamination members 22. From the preceding consideration, it follows that the ratio of the area of member 20 over which the lamination members 22 are distributed to the total areas of contact between the lamination members 22 and the member 20 is within a preselected range. Based on the aforesaid value, this area ratio is between approximately 19:1 to 7:1.

If maximum power is to be delivered to the liquid medium with little consideration to efficiency, it may be advisable to use a solid construction with no spacing between the lamination members 22 which will not be loaded extensively; in other words, it will vibrate with about the same amplitude whether or not the liquid medium is present. However, where efficiency of operation is important as it is in the operation of most transducer units, the spaced lamination construction in accordance with the present invention offers a substantial advantage.

The construction of the immersible unit transducer device 10 as shown in FIG. 2 is such that its manufacturing cost is competitive with any presently available commercial transducer devices now on the market. In addition, from the standpoint of ruggedness, high temperature operation and overall reliability of the transducer device, it appears to have a definite and marked advantage over prior art transducer devices now available. The maximum efficiency actually obtainable with the transducer device as shown in FIG. 2 is dependent upon the magnetostrictive material used for the lamination members 22. However, for a given material, the transducer device, as shown in FIG. 2 has a better and near optimum performance characteristic.

It should be readily apparent that the spaced lamination structure is very advantageous regarding cooling of the structure either by air or a liquid during the operation thereof.

Figure 8:
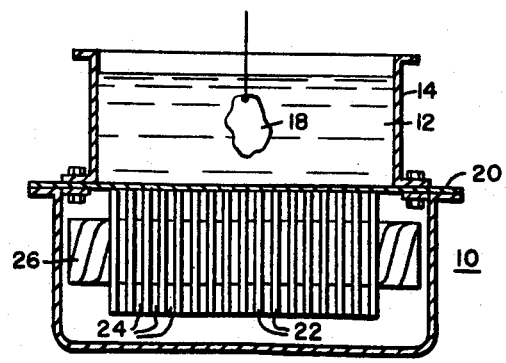
FIG. 8 shows a still different modification of the apparatus.

In FIG. 8 there is shown a still further modification of the present apparatus, where the transducer unit 10 is not of the immersible type but instead is of the integral type wherein the lamination members 22 are fastened to one of the walls or the bottom as may be desired, that effectively determine the liquid containing tank 14 for cleaning a workpiece 18.

Although the present invention has been described with a certain degree of particularity, it should be understood that the present disclosure in the specification and particularly in the drawings has been made only by way of example and illustration and that numerous changes in the details of construction and the combination and arrangement of parts may be resorted to without departing from the scope and spirit of the present invention.

I claim as my invention:

1. A transducer assemblage comprising a rectangular sheet-like radiating plate member for vibration-inducing contact with a liquid; a plurality of groups of parallel-arranged magnetostrictive laminations less than six mils thick extending lengthwise in a direction normal to said radiating plate in respective rows, bonded at respective ends to said radiating plate as the exclusive agents for vibrating such plate, and constructed and arranged to have an average spacing of from thirty to ninety mils between all adjacent elements; and a plurality of coil means coupled magnetically to the groups of lamination elements, respectively, to produce a uniform vibratory response of said radiating plate.

2. In a magnetostrictive transducer, a sheet-like radiating plate for transmitting vibrations to a liquid, magnetostrictive means connected to said plate for vibrating same, said magnetostrictive means including at least one group of parallel-arranged magnetostrictive laminations less than six mils thick arranged in a row, extending perpendicular to said radiating plate, and having their ends secured to said plate for vibrating same, said laminations each having corrugations for flexural rigidity and being distributed over an area of said plate as the exclusive plate vibrating means within the plate area embraced by said laminations, and having sufficient voided space between elements to provide an average spacing of from thirty mils to ninety mils, whereby the mechanical impedance of said transducer may be matched substantially to the impedance of the aforesaid liquid for efficient vibration thereof.

3. A transducer assembly comprising a sheet-like radiating member, and a plurality of substantially planar magnetostrictive elements each having a plurality of corrugations extending lengthwise therein for rigidity, said elements being attached at one of their thin end edges to said radiating member in lengthwise extension perpendicularly with respect thereto, being disposed in double-end open array without any other similar elements intermediate thereto, and being so arranged as to have an average uniformly-distributed space therebetween which is greater than their thickness by a factor of from six to eighteen.

4. A transducer assembly as set forth in claim 3, wherein said magnetostrictive elements are shaped to be effectively self-spacing.

5. A transducer assembly as set forth in claim 3, wherein each of said magnetostrictive elements has an opening extending thickness-wise therethrough in alignment with corresponding openings of the other magnetostrictive elements in linear array therewith, and a coil means extending through such openings for magnetic energization of the magnetostrictive elements.

6. A transducer assembly as set forth in claim 3, wherein the width of the aforesaid thin end edges attached to said radiating member is approximately at least one-half the length of the magnetostrictive elements.

References Cited by the Examiner
UNITED STATES PATENTS

| 2,044,807 | 6/36 | Noyes | 340—9 |
| 2,170,206 | 8/39 | Mason | 340—9 |
| 2,401,943 | 6/46 | Leigh et al. | 340—11 |
| 2,292,555 | 8/42 | Wesch. | |
| 2,724,818 | 11/55 | Camp | 310—26 |
| 2,885,577 | 5/59 | Zaerr | 310—26 |
| 2,891,176 | 6/59 | Branson | 310—8.1 |
| 2,957,994 | 10/60 | Dickey | 310—26 |

MILTON O. HIRSHFIELD, *Primary Examiner.*

LEO QUACKENBUSH, *Examiner.*